United States Patent
Wallace et al.

[11] 3,899,068
[45] Aug. 12, 1975

[54] FEEDING APPARATUS

[75] Inventors: Gary Leonard Wallace, Oak Lawn; John J. Linehan, Arlington Heights; Robert Howard Marshall, Hinsdale, all of Ill.

[73] Assignee: Chemetron Corporation, Chicago, Ill.

[22] Filed: Mar. 25, 1974

[21] Appl. No.: 454,262

Related U.S. Application Data

[63] Continuation-in-part of Ser. No. 293,145, Sept. 28, 1972, abandoned.

[52] U.S. Cl. ............... 198/27; 198/20 R; 214/1 BD
[51] Int. Cl. ............................................. B65g 47/00
[58] Field of Search.... 198/20 R, 27, 94, 99, 127 R, 198/156, 157; 214/672, 1 B, 1 BB, 1 BD

[56] References Cited
UNITED STATES PATENTS

| | | | |
|---|---|---|---|
| 673,258 | 4/1901 | Harrington | 198/156 |
| 2,392,523 | 1/1946 | Cramer | 198/27 |
| 2,643,757 | 6/1953 | Kovatch | 198/27 |
| 2,918,164 | 12/1959 | Austin et al. | 198/27 |
| 3,209,886 | 10/1965 | Yock | 198/20 R |
| 3,313,399 | 4/1967 | DeGood | 198/127 R |
| 3,593,862 | 7/1971 | Pierson et al. | 198/157 |

*Primary Examiner*—Evon C. Blunk
*Assistant Examiner*—Joseph E. Valenza
*Attorney, Agent, or Firm*—Mason, Kolehmainen, Rathburn & Wyss

[57] ABSTRACT

Apparatus for handling elongated loaves or similar masses of food product, such as luncheon meat, or the like, comprises a table adapted to hold a plurality of the masses in laterally abutting relation, means for elevating the masses sequentially from the table, and a conveyor arranged to receive the masses sequentially from the elevating means and to convey the masses longitudinally. Where it is desired to direct the loaves downwardly, as to direct the loaves into a vertically fed slicer, the apparatus further may comprise a downwardly curved chute or other means for receiving the masses from the conveyor and for directing the masses downwardly.

12 Claims, 6 Drawing Figures

FEEDING APPARATUS

This application is a continuation-in-part of copending U.S. Pat. application Ser. No. 293,145, filed Sept. 28, 1972 and now abandoned.

The present invention pertains to new and improved apparatus for handling elongated loaves or similar masses of food product such as luncheon meat and the like. Such products are produced in elongated loaves, often 4 to 6 feet long and 4 to 6 inches in transverse dimension, having generally uniform cross-sections.

The present invention is addressed to the handling of such loaves and similar masses as in the feeding of such loaves into a slicer in which successive slices are cut transversely from the loaves fed into the slicer. The apparatus of the present invention has particular utility in the feeding of such loaves into vertically fed slicing apparatus of the type disclosed in the copending U.S. Pat. application, Ser. No 293,669, filed Sept. 28, 1972 which is assigned to the assignee of the present application.

Accordingly, an object of the present invention is to provide new and improved apparatus of a type particularly adapted to the handling of elongated loaves and similar masses of food product such as luncheon meat and the like.

Other objects of the present invention are to provide new and improved apparatus of the type set forth above comprising means for elevating the masses sequentially from a table, to provide such apparatus further comprising a conveyor arranged to receive the masses sequentially from the elevating means and to convey the masses longitudinally, to provide such apparatus further comprising means for receiving the masses from the conveyor and for directing the masses downwardly, and to provide such apparatus wherein the receiving and directing means comprises a downwardly curved chute having an upper open end positioned to receive the masses from the conveyor and a lower open end positioned to discharge the masses downwardly.

Other objects of the present invention are to provide new and improved apparatus of the type set forth above wherein a plurality of such masses can be held in laterally abutting relation on a table, to provide such apparatus wherein the table comprises a plurality of parallel freely rotatable rollers arranged to permit the masses to be moved in laterally abutting relation across the rollers from a mass-receiving end of the table to a mass-discharging end of the table, and to provide such apparatus wherein a portion of the table at the mass-discharging end is inclined downwardly.

Another object of this invention is to provide new and improved apparatus of the type set forth above wherein the masses are elevated sequentially by elevating means comprising an elongated pivotal carriage mounted for pivotal movement about a horizontally disposed axis between a first upright position and a second inclined position, means for pivoting the structure between these positions, an elevator mounted on the carriage for reciprocal movement along the carriage upwardly toward an upper rest position and downwardly toward a lower rest position, and means for driving the elevator upwardly and downwardly along the carriage, and wherein the elevator is adapted to lift one such elongated mass from the table as the elevator is driven upwardly from the lower rest position with said carriage in the second inclined position and to discharge the mass onto the conveying means as the elevator is driven downwardly along the carriage with the carriage in the first upright position after the carriage has been pivoted to the first upright position with the elevator in the upper rest position. Other objects of the present invention are to provide such apparatus further comprising means for controlling the pivoting means and the driving means to cause, sequentially, the elevator to be driven upwardly along the carriage to the upper rest position with the carriage in the second inclined position, the carriage to be pivoted from the second inclined position to the first upright position with the elevator in the upper rest position, the elevator to be driven downwardly along the carriage to the lower rest position with the carriage in the first upright position, and the carriage to be pivoted to the second inclined position with the elevator in the lower rest position, and to provide such apparatus further comprising means for inhibiting pivotal movement of the carriage from the second inclined position to the first vertical position with the elevator in said upper rest position while another such elongated mass is on a conveyor to which the masses are discharged by the elevator.

Still other objects of the present invention are to provide new and improved apparatus of the type set forth above wherein the masses are elevated sequentially and received by a conveyor comprising a plurality of parallel rollers having their axes disposed in a common horizontal plane, the rollers being positioned to receive the masses sequentially from the elevating means such that the masses are disposed longitudinally across the rollers, and means for driving the rollers to convey the masses longitudinally, and to provide such apparatus wherein the driving means enables the rollers to stall if a mass on the rollers is blocked from being conveyed by the conveyor.

These and other objects, features, and advantages of the present invention will be evident from the following description, with the aid of the accompanying drawings, of a preferred embodiment of the present invention.

Briefly, as set forth in the following paragraphs, the preferred embodiment described hereinafter provides apparatus comprising a table adapted to hold a plurality of elongated masses of food product in laterally abutting relation, means for elevating the masses sequentially from the table, and a conveyor arranged to receive the masses sequentially from the elevating means and to convey the masses longitudinally. The table comprises a plurality of parallel rollers arranged to permit the masses to be moved in laterally abutting relation across the rollers from a mass-receiving end of the table to a mass-discharging end of the table. A portion of the table at the mass-discharging end is inclined downwardly. The elevating means comprises an elongated pivotal carriage mounted for pivotal movement about a horizontally disposed axis between a first upright position and a second inclined position, means for pivoting the structure between these positions, an elevator mounted on the carriage for reciprocal movement along the carriage upwardly toward an upper rest position and downwardly toward a lower rest position, and means for driving the elevator upwardly and downwardly along the carriage.

The elevator is adapted to lift one such elongated mass from the lower rest position with the carriage in the second inclined position and to discharge the mass onto the conveying means as the elevator is driven downwardly along the carriage with the carriage in the first upright position after the carriage has been pivoted to the first upright position with the elevator in the upper rest position.

The pivoting means and the driving means are controlled to cause, sequentially, the elevator to be driven upwardly along the carriage to the upper rest position with the carriage in the second inclined position, the carriage to be pivoted from the second inclined positioned to the first upright position with the elevator in the upper rest position, the elevator to be driven downwardly along the carriage to the lower rest position with the carriage in the first upright position, and the carriage to be pivoted to the second inclined position with the elevator in the lower rest position. Means are provided for inhibiting pivotal movement of the carriage from the second inclined position to the first vertical position with the elevator in said upper rest position while another such elongated mass is on a conveyor to which the masses are discharged by the elevator.

The conveyor comprises a plurality of parallel rollers having their axes disposed in a common horizontal plane, the rollers being positioned to receive the masses sequentially from the elevating means such that the masses are disposed longitudinally across the rollers, means for driving the rollers to convey the masses longitudinally, the driving means enabling the rollers to stall if a mass on the rollers is blocked from being conveyed by the conveyor.

Figure 1:
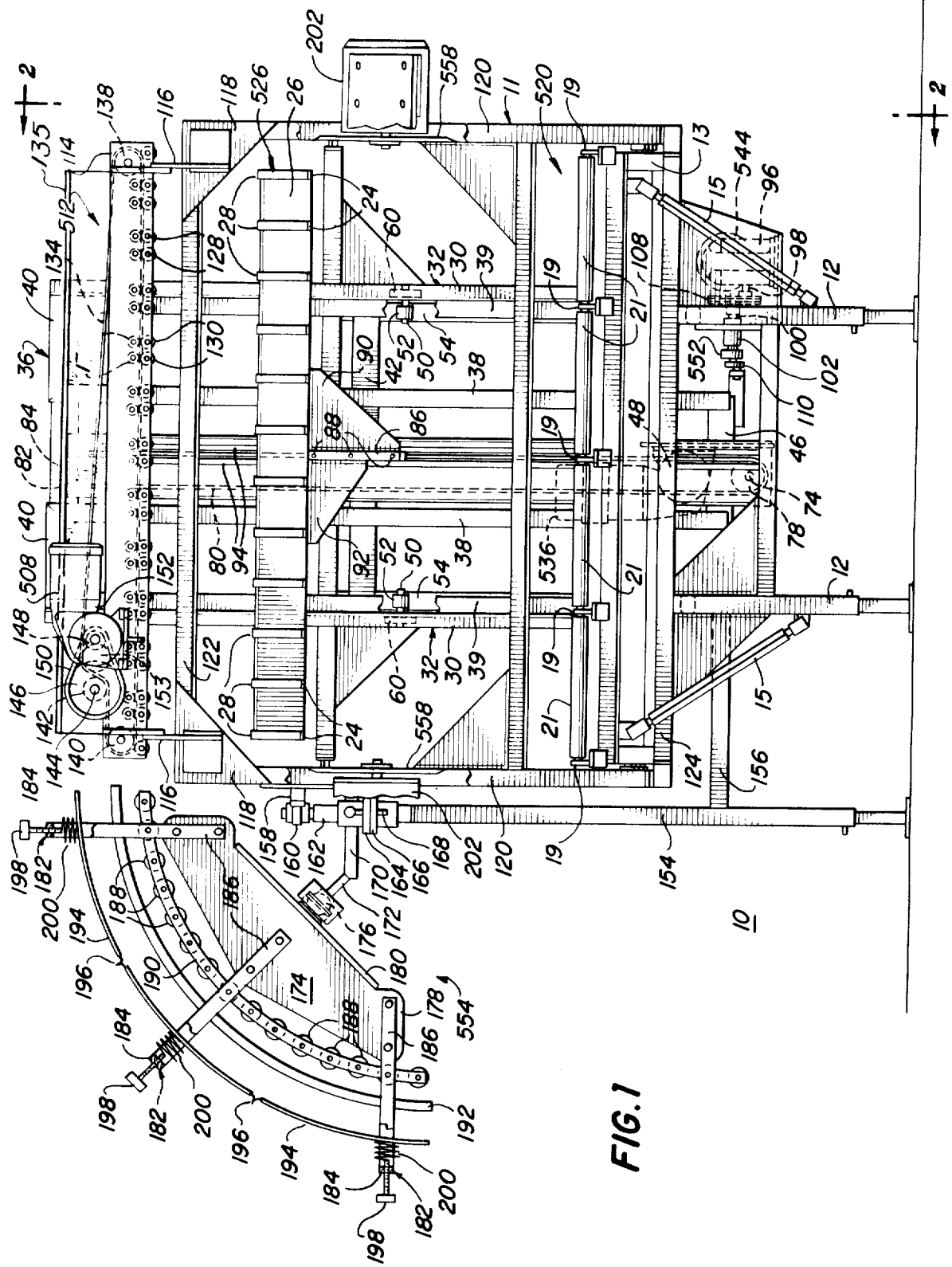
FIG. 1 is a front elevational view taken from the loading side of a new and improved feeding apparatus for handling elongated loaves of food product and the like constructed in accordance with the features of the present invention.
Figure 2:
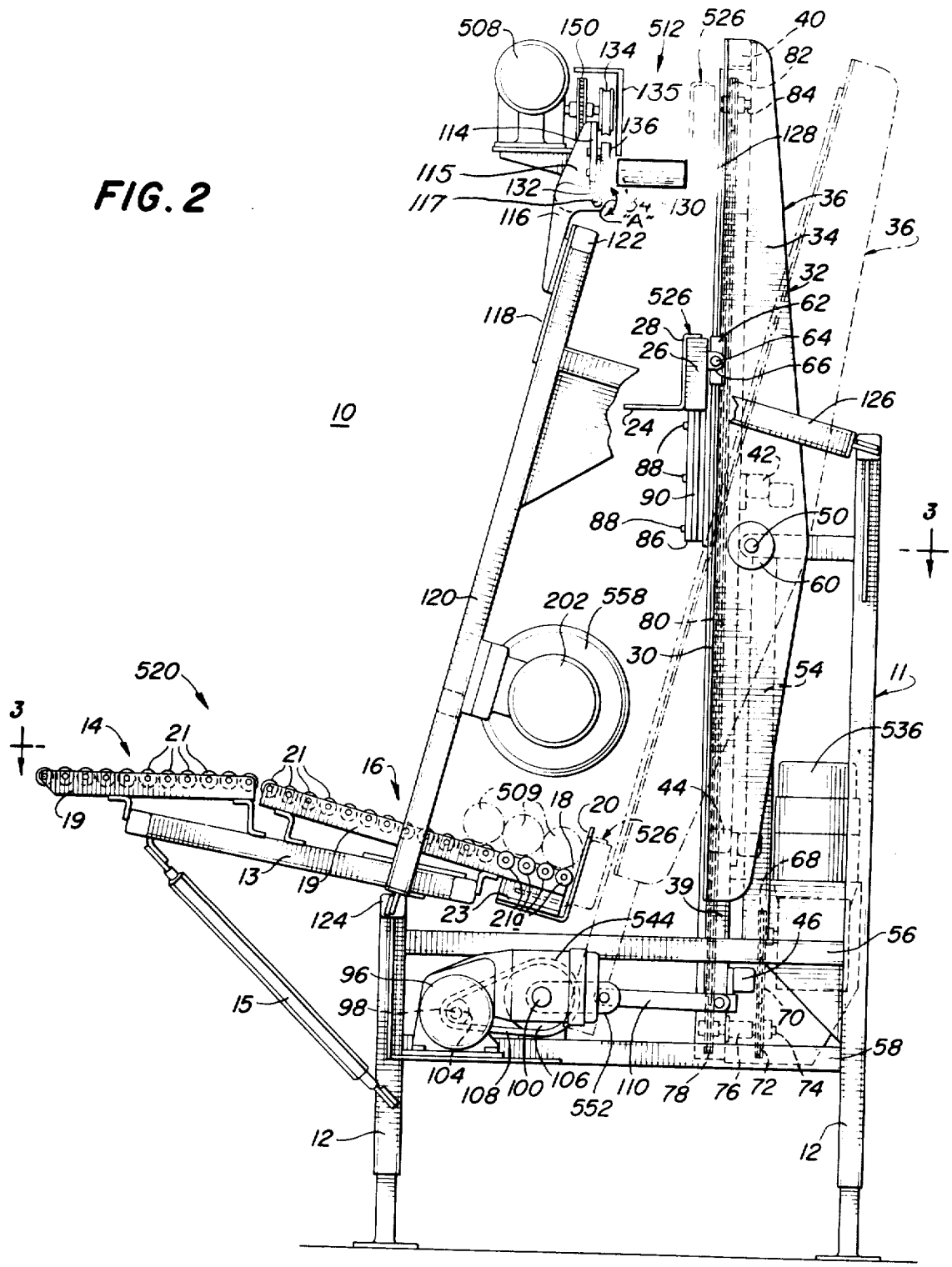
FIG. 2 is a side elevational view looking in the direction of arrows 2—2 of FIG. 1.
Figure 3:
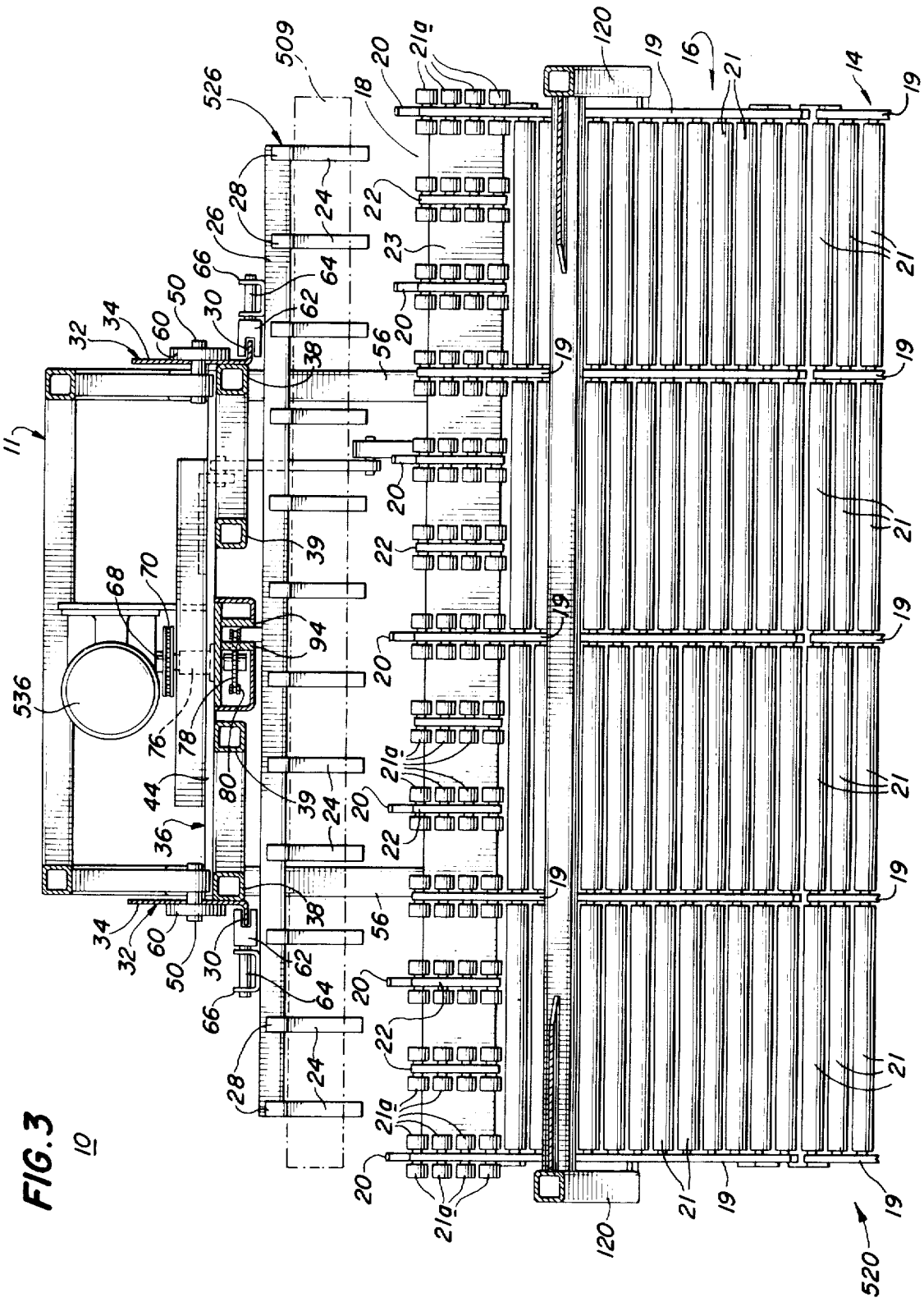
FIG. 3 is a fragmentary plan view of a segment of the discharge end of the feeding table of the apparatus taken substantially along lines 3—3 of FIG. 2.

Referring now more particularly to the drawings, in FIGS. 1, 2 and 3 is illustrated a new and improved feeding apparatus 10 for handling elongated loaves or masses 509 of food product such as luncheon meat, process cheese, sausage and the like. The apparatus is adapted to receive loaves of food product at random intervals from a supply cart, hand truck or the like at a normal working level above the floor and to subsequently elevate the loaves one at a time to a higher level. The loaves are fed at the higher level in longitudinal end-to-end relation and are then directed downwardly along a downward feed path into a slicer such as that shown in the copending U.S. Pat. application, Ser. No. 293,669 filed Sept. 28, 1972, which application is assigned to the same assignee as the present application and which application is incorporated herein by reference.

The feeding apparatus or loader 10 includes a table structure generally indicated by the numeral 520 for receiving and holding a plurality of loaves 509 in laterally abutting horizontal position. The table structure is supported by an upstanding structural framework generally indicated by the numeral 11 and an elevator 526 is provided for receiving the loaves from a lower discharge side 18 of the table structure 520 and elevating the loaves one at a time to a higher level. The elevator is supported from the frame structure 11 as is a lateral transfer conveyor 512 mounted adjacent the upper end of the frame structure and adapted to move the loaves laterally outwardly in longitudinal end-to-end relation. As the elongated loaves 509 are fed laterally outwardly in longitudinal end-to-end relation by the lateral transfer conveyor into the upper end of a downwardly curving discharge chute structure 554 having a lower end adapted to be centered over the inlet to a feeder, slicer, or other component (not shown).

The frame structure 11 includes a plurality of upright legs 12 having adjustable lower sections for supporting the apparatus from the floor or other suitable structure so that the table 520 is set up at a desired working level for receiving the elongated loaves 509 of food product. The table structure 520 provides a storage or holding queue for the loaves resting in side by side horizontal position while waiting to be lifted upwardly one at a time by the elevator 526. The table structure 520 includes a rectangular support or base frame 13 mounted with one side supported from the front legs 12 and having an outer opposite side adjustably supported by a pair of struts 15 which are adjustable in length to select and adjust the level or tilt angle of the base. The struts have lower ends pivotally secured to the front legs 12 and upper ends pivotally connected to the support frame 13 along the outer side. The table frame supports a level loaf receiving section 14 and a downwardly sloping gravity feed section 16 with a lower discharge side 18 terminating adjacent the pickup point where the loaves are picked up and lifted by the elevator 526. The desired angle of slope of the gravity feed section 16 of the table determines the amount of bias toward the elevator when more than one loaf is present on the table awaiting pickup.

As best shown in FIG. 1 each of the table sections 14 and 16 includes a plurality of spaced parallel ribs 19 extending transversely of the longitudinal axes of the loaves and a plurality of freely rotating feed rolls 21 is supported at opposite ends between adjacent pairs of ribs. The table rolls 21 of the receiving section 14 and the gravity feed section 16 are preferably of a standard size and dimension except that the lower four rows of rolls adjacent the lower discharge side 18 of the table feed section 16 comprise rolls 21a of relatively short length supported in cantilever fashion on stub axles extended from short ribs 22. The ribs 22 are disposed between the longer ribs 19 but are supported on a cross member 23. The rolls 21a are arranged to define a plurality of access slots between ends of the rolls spaced across the discharge side of the table structure so that lift fingers 24 of Z-shaped lifts 28 attached to an elongated lift bar 26 of the elevator 526 may move freely beneath the lowermost loaf 509 that is resting along the discharge side 18 of the table structure for pickup and lifting. The lifters 28 are spaced longitudinally at intervals along the lift bar 26 and have short upper end segments welded or otherwise secured to the upper edge of the lift bar. A plurality of upright loaf stops 20 are provided at the lower ends of the ribs 22 adjacent the discharge side 18 of the gravity feed section 16 to prevent the loaves 509 from rolling off the table structure when the lower end of the elevator 526 is moved away from the loaf pickup position. The stops 20 extend upwardly above the level of the table rollers 21a to engage the lowermost loaf at or above its centerline. The horizontal lift bar 26 of the elevator 526 is guided as it moves up and down between a lower or pickup position and an upper position by outwardly extending guide flanges 30 on a pair of parallel upright guides 32. The guides are of angular cross-section and include rearwardly extending webs 34 having a maximum width adjacent an intermediate level. The webs taper to a reduced width adjacent the upper and lower ends as best shown in FIG. 2. The elevator guides 32 are mounted on opposite sides of a generally rectangular carriage frame generally indicated by the reference numeral 36 mounted for rocking movement about a horizontal pivot axis adjacent its mid level. The carriage frame includes a pair of outer parallel upright members 38 attached to the guides 32 and a pair of parallel upright inside members 39 all of which are interconnected adjacent their upper ends by horizontal cross members 40. The uprights are interconnected at the mid level by a cross member 42 and at the lower level by a cross member 44. The inside pair of uprights 39 extend downwardly below the lower ends of the outer members 38 and are interconnected with a short cross member 46 to provide a structure for supporting an elevator drive motor 536 and its associated right angle gear reducer 48 and other components. The elevator carriage frame 36 is supported for rocking movement, between an inclined or tilted position (dotted lines) for pickup and lifting of the loaves 509, and a vertical or upright position (solid lines) for depositing the loaves, by means of a pair of short pivot axles 50 mounted in bearing blocks 52. The bearing blocks are positioned at the upper end of a pair of intermediate uprights 54 of the frame structure 11. The uprights 54 are interconnected by lower horizontal side members 56 extending between the forward and rearward legs 12 at a level below the discharge end of the table structure 520 and at the upper ends the uprights are interconnected via upper side members 58 to the rear pair of legs 12 of the main frame 11. The pivot axles 50 journalled in the bearings 52 extending outwardly in opposite directions through apertures provided in the wide mid-level portion of the webs 34 of the carriage guides 32 and relatively thick circular shaped strengthening disks 60 are provided to reinforce this area.

The lift bar 26 is guided up and down the carriage 36 on a pair of vertically slotted guide blocks 62 disposed for sliding engagement on the outside flanges 30 of the guides 32. The guide blocks 62 are pivotally secured to the lift bar 26 by means of horizontal pivot pins 64 which extend outwardly and are seated in bearing blocks 66 secured on the rear face of the lift bar. The elevator drive motor 536 is reversible and the low speed output of the gear reducer 48 driven thereby is coupled by a sprocket 68 and chain 70 drivingly engaging a sprocket 72 on the rearward end of a main elevator drive shaft 74. The shaft is supported for rotation by a bearing 76 mounted on the lower cross member 46 of the carriage frame. At the forward end, the drive shaft 74 is provided with a sprocket 78 in driving engagement with the lower end of an endless elevator chain loop 80. The upper end of the chain 80 is entrained around an upper support sprocket 82 mounted on an idler shaft 84. The idler shaft is supported in bearing means (not shown) mounted between the inside uprights 39 of the elevator carriage frame 36.

As best shown in FIG. 1, the right hand vertical run of the chain loop 80 is connected to move the horizontal lift bar 26 at the center thereof by means of a downwardly depending member 86. The member is connected to one or more pivot links of the chain by detachable pins 88. The connector is maintained at a right angle to the lift bar and is maintained in vertical alignment by a pair of triangularly shaped stiffening gussets 90 and 92. The vertical drive run of the chain loop 80 is guided between a pair of upright chain guides 94 spaced between the uprights 39 of the carriage frame. The lift bar 26 is driven up and down at its center by the chain 80 and is guided on opposite sides of the center by the vertically slotted guide blocks 62 which move in sliding engagement on the outer flanges 30 of the guides 32. Movement of the lift bar 26 and lifter 28 between a lower or loaf pickup position and an upper position is provided by reversibly driving the endless chain loop 80 in either direction with the reversible motor 536.

The elevator carriage frame 36 is tiltable or rockable between an upright or vertical position and an inclined or tilted position about the pivot axles 50 which are positioned at an intermediate level between the upper and lower end of the elevator structure. For the purpose of rocking or tilting the frame 36 back and forth between the upright and the tilted position, a positioning motor 544 is mounted on the frame structure 11 on a support platform at a level adjacent the level of the lower end of the inside uprights 39 of the elevator carriage frame 36. The motor 544 is drivingly connected to a gear reducer 96 having a right angle output shaft 98 which rotates a crank shaft 100 supported in a bearing 102 mounted on the frame structure 11. The crank shaft is driven at a reduced speed from the output shaft 98 via a pair of sprockets 104 and 106 interconnected by a chain 108. The crank shaft 100 rotates a radial crank arm 552 having an elongated slot adjacent one end. A drive link 110 is pivotally connected at one end to drive the lower end of the carriage frame 36 back and forth as the crank arm rotates. A bracket 112 is provided to interconnect the upright members 39 and the drive link 110 which is adjustably connected to the slotted end of the crank arm. The crank arm 552 is driven by the motor 554 to rotate in steps of 180° increments thereby to reciprocate the lower end of the elevator carriage frame 36 toward and away from the pickup position adjacent the lower discharge side 18 of the table structure 520.

After the carriage frame 36 is in the inclined or tilted position (dotted lines FIG. 2) with the lift bar 26 at the lower end of the elevator and the fingers 24 positioned beneath a loaf 509, the motor 536 is energized to drive the centrally positioned drive run of the endless chain loop 80 upwardly and move the lift bar with the loaf thereon to an upper position adjacent the top of the carriage frame as shown in FIG. 1. A limit switch is provided to deenergize the elevator motor when the lift bar reaches the top. The carriage frame 36 may remain in the tilted position with the elevator lift bar 26 adjacent the upper end until the positioning motor 544 is energized to rotate the crank arm 552 by an increment of approximately 180° causing the lower end of the elevator carriage to move right (FIG. 2) and the upper end of the carriage to move left to the upright or vertical position for depositing the elevated loaf 509 on the lateral discharge conveyor 512 upon downward travel of the lift bar. Downward travel of the lift bar on the carriage frame is accomplished by energizing the motor 536 in a reverse direction causing the drive run of the chain loop 80 to move downwardly and drive the lift bar 26 downwardly until a lower level limit switch is activated to deenergize the motor.

After each new loaf 509 of food product is picked up by the elevator at the lower discharge side 18 of the gravity feed table 16, the next adjacent loaf in position rolls downwardly by gravity because of the slope into the number one position ready for pickup. The table stop fingers 20 retain the loaf in a pickup position until the elevator is activated on a lifting stroke.

With a loaf 509 of food product still present on the drive rolls of lateral transfer conveyor 512 as sensed by one or more limit switches, the next succeeding loaf brought up by the elevator will be retained on the lifters 28 in an elevated or upper level position and the carriage frame will be retained in the tilted position until such time as the loaf in the transfer conveyor is fed out. Accordingly a loaf is normally maintained in an elevated position with the frame in its tilted position in readiness for rapid delivery to the lateral transfer conveyor so that the successive loaves will be fed laterally outwardly (right to left FIG. 1) in close end-to-end longitudinal relation without interruption as long as the loaves are available. After an elevated loaf is delivered to a position above the lateral transfer conveyor 512 by movement of the elevator frame to the vertical position, the lift bar 26 and supporting fingers 24 are moved downwardly to deposit the loaf on the conveyor rolls. A pickup cylinder for the next loaf waiting on the table structure is initiated and the loaf is moved to the elevated position and held in readiness for delivery to the lateral transfer conveyor 512 after the preceding loaf has moved past a selected position as sensed by a limit switch.

In accordance with the present invention, the lateral transfer or cross-feed conveyor 512 includes an elongated horizontally extending vertical base plate 114 supported at opposite ends on pairs of brackets 116 attached at their lower ends to triangularly shaped gussets 118. Each gusset is secured to an upper end portion of a rearwardly sloped upright 120 and an outer end portion of a horizontal cross member 122 is secured to the uprights at the top. The base plate 114 is provided with a pair of brackets 115 which are pivotally interconnected with the brackets 116 on the frame structure and pivot pins 117 are provided for the pivotal connection between these brackets. The lower ends of the uprights 120 are supported from a lower horizontal frame member 124 carried by the front pair of frame legs 12 of the frame structure 11. Downwardly and rearwardly sloped side frame members 126 (FIG. 2) are provided to strengthen and interconnect the uprights 120 and the rear legs 12 of the frame structure.

The conveyor base plate 114 comprises a sheet of relatively thick steel for supporting, at longitudinally spaced intervals thereof, adjacent pairs of transversely spaced outwardly extending roll axles 128. The axles 128 are in a common plane and each supports a cylindrical drive roll 130 for engaging the underside of a loaf deposited thereon and driving or feeding the loaf longitudinally of its axis into the discharge chute structure 554.

As best shown in FIG. 2, the brackets 115 supporting the base plate 114 are pivotal on the pins 117 so that the common plane of the axes of the drive rolls 130 can be angularly adjusted as shown by the arrow A. This adjustment may be used to align the rolls axes in an exact horizontal plane or may provide for the outer ends of the rolls to be slightly higher than the inner ends so that the loaves 509 placed on the rolls will not roll off the outer ends of the rolls if longitudinal feeding of the loaves is momentarily interrupted. The drive rolls are grouped in pairs and spaced horizontally along the length of the base plate 114 in order to provide slots or open areas therebetween for permitting the lift fingers 24 to pass freely through the plane of the rolls and move downwardly between the rolls without interference to deposit a loaf thereon. Each drive roll 130 includes a recessed drive hub section 132 adjacent the inner end with belt flanges on opposite sides to laterally retain in driving contact therewith an endless drive belt 134. Preferably, the belt is cleated and is formed of resilient material such as rubber or the like. The belt is arranged with a lower run traversing a path from right to left (FIG. 1) to drivingly engage the upper portion of the hub section 132 of the drive rolls and turn the rolls in a counter clockwise direction for moving an elongated loaf of food product on the rolls from right to left into the entrance at the upper end of the discharge chute structure 554.

Centered above each of the drive roll hub sections 132 there is provided a resilient pinch roll 136 for biasing the belt 134 to drive the roll hub. The biasing force of the pinch rolls is selected so that should the lateral movement of a loaf be interrupted or stopped, the weight of the loaf on the drive roll will be sufficient to prevent rotation of the rolls. The belt however may continue to move and slippingly engage the drive hubs 132 until the loaf is free to move. The rolls 130 are thus stallable under the weight of a nonmoving loaf and do not continue in rotative engagement against the under surface of the loaf to cause pockets of fat to develop, breakage of the casing of the loaf, or other damage to the product as may occur if rubbing contact is allowed to continue for too long a time period. The pinch rolls 136 and the belt 134 permit slippage between the belt and drive rolls 130 so that the weight of a stationary loaf of food product resting on the drive rolls is enough to stall the roll against rotation even though the belt 134 is continuously moving in contact with the hub section 132 of the rolls. The rolls are thus individually stallable dependent on the weight applied thereto. In order to prevent contact between the pinch rolls 136, belt 134, drive components and the loaves 509 placed on the rolls 130, an elongated sheet metal guide 135 of angular cross-section (FIG. 2) is provided to guide the loaves and shield the moving belt and pinch rolls. With the rolls 130 tilted so that their outer ends are slightly higher than the inner ends, the loaves 509 will roll against the vertical face of the guide 135 as the loaves are fed longitudinally by the lateral discharge conveyor.

Referring to FIG. 1, the belt 134 is entrained around a belt idler pulley 138 at the right hand side and a similar idler pulley 140 adjacent the left hand side. The upper run of the belt moves from left to right and passes under a driving roll 142 mounted on a shaft 144 which is driven via a pair of sprockets 146 interconnected by a chain 150. The smaller drive sprocket 148 is mounted on the output shaft of a gear reducer 152 driven by a lateral transfer conveyor drive motor 508. After passing under the driving roll 142, the belt moves over a horizontally adjustable tension roll 153 which is adjustable toward and away from the drive roll 142 to provide the proper tension on the belt so that a slippage as described may be achieved. The belt passes on a downward slope from the tension roll 154 toward the right hand idler roll 138 and then passes horizontally along its lower run from right to left engaging the drive hub portions 132 of the loaf driving rolls 130.

As the loaves 509 of meat product are laterally transferred from right to left (FIG. 1) by the drive rolls 130 of the lateral transfer conveyor 512, the loaves move in a generally horizontal path into an upper receiving end of the discharge chute structure 554. The structure is adapted to change the direction of feed of the loaves from the horizontal to a downwardly directed feed path for entry into a feeder mechanism or the like of a slicer or other apparatus. The chute structure is supported from an upright column 154 adjustable in length so that the height of the chute may be adjusted as required and the column is structurally interconnected with the main frame 11 by means of a lower cross member 156 and an upper tie member 158. A bearing 160 is mounted on the tie member 158 to support for swivel movement about a vertical axis a short stub axle 162 having a flanged fitting 164 at the lower end. The flanged fitting is adapted to rest on a similar fitting 166 on the upper end of the support column 154. Relative rotational movement between the flanges of the fittings 164 and 166 permits the angular plane of discharge of the chute to be adjusted and a removable key 168 is provided to interlock the flanges once a selected angular position has been set up. The upper fitting 164 supports a radially outwardly extending arm 170 having an upwardly and outwardly extending support finger 172 at the outer end. The finger is adapted to support a base 174 for the chute structure on a ball joint assembly 176 which permits the chute base to be pivoted or oriented in a selected orientation relative to both the horizontal and a vertical axis. Once the position is adjusted, the ball joint is tightened and held by clamping means (not shown). The chute base structure 174 comprises a pair of spaced apart side plates 178 interconnected by a sloping bottom 180 and a plurality of outwardly extending U-shaped hangers 182 are secured to the side plates by appropriate fastening means. The hangers extend outwardly away from the bottom 180 with the angular array as shown in FIG. 1. Each U-shaped hanger includes a transverse upper bight portion 184 and a pair of spaced apart parallel legs 186 secured to the outside surfaces of the respective side plates 178.

In order to guide the underside of the elongated loaves 509 from the horizontal entry path to a downward feed direction or path there is provided a plurality of freely rotatable lower support rolls 188. The rolls are supported for free rotation on axles extending outwardly from opposite ends and the axles are supported by a pair of curved side members 190. The side members are supported from the legs 186 of the U-shaped hangers 182. Side guidance of the downwardly moving loaves 509 is provided by a pair of curved side guides or walls 192 supported inwardly of the hanger legs 186 for movement toward and away from one another as required.

The upper side of the loaves 509 are biased and guided downwardly toward the curved path of the lower guide rolls 188 by a downwardly curved upper guide wall 194 formed of flexible sheet material such as plastic or the like. The upper guide wall is disposed between the legs 186 of the hanger 182 and may be formed in one or more ribbons interconnected by flexible connectors such as tape segments 196. Adjustment of the position of the flexible upper guide 194 relative to the lower guide rolls 188 is achieved by a plurality of hand wheels 198 or levers mounted on the outer end of adjustment rods 199. The adjustment rods extend through threaded apertures provided in the bight portions 184 of the U-shaped hangers 182. The inner ends of the rods 199 are connected to coil springs 200 which are mounted on the outside or back surface of the flexible upper guides 194. The flexible upper guides 194 cam the ends of the loaves 509 fed from the transfer conveyor 512 downwardly along the lower guide rolls into a downward feed path. The discharge chute 554 is readily adjustable in position to receive the horizontally moving loaves 509 of food product from the lateral transfer conveyor 512 and reorient the loaves on a downwardly directed feed path on a vertical axis or at a selected angle downwardly relative to the horizontal.

Typically, the loaves 509 and similar masses are produced with generally bullet-shaped ends attributable to the casings into which food products such as luncheon meat and the like commonly are packed. If such ends were to be left on the masses as the masses were fed to slicing apparatus, a plurality of partial slices, often called "sliver" slices, would be produced. Such particular "sliver" slices accumulate as unwanted debris which disrupt the various slice accumulating, weighing, and handling functions often required in slicing apparatus. Manual cropping is not entirely satisfactory inasmuch as such cropping allows partial or "sliver" slices to be formed if the ends are not precisely normal to the respective longitudinal axes of the masses.

In order to precisely cut off or crop the rounded or bullet-shaped ends of the elongated loaves 509 of food product to prevent "sliver" slices and in order that as the loaves are fed longitudinally in end-to-end relation there will be little if any interruption in a substantially uniform cross-section of flowing product, the loader 10 includes a pair of horizontally spaced apart rotary cropping knives 558 driven to rotate in parallel vertical cutting planes or paths by drive motors 202. The cutting paths are positioned adjacent the outer rounded ends of the loaves so that as each loaf is lifted on the fingers 28 of the carriage lift bar 26 toward an elevated position, the loaf ends are passed through the cutting planes of the knives and are precisely squared off. The cropped ends drop downwardly and are collected in suitable means for rework.

CONTROL CIRCUIT

Figure 4:
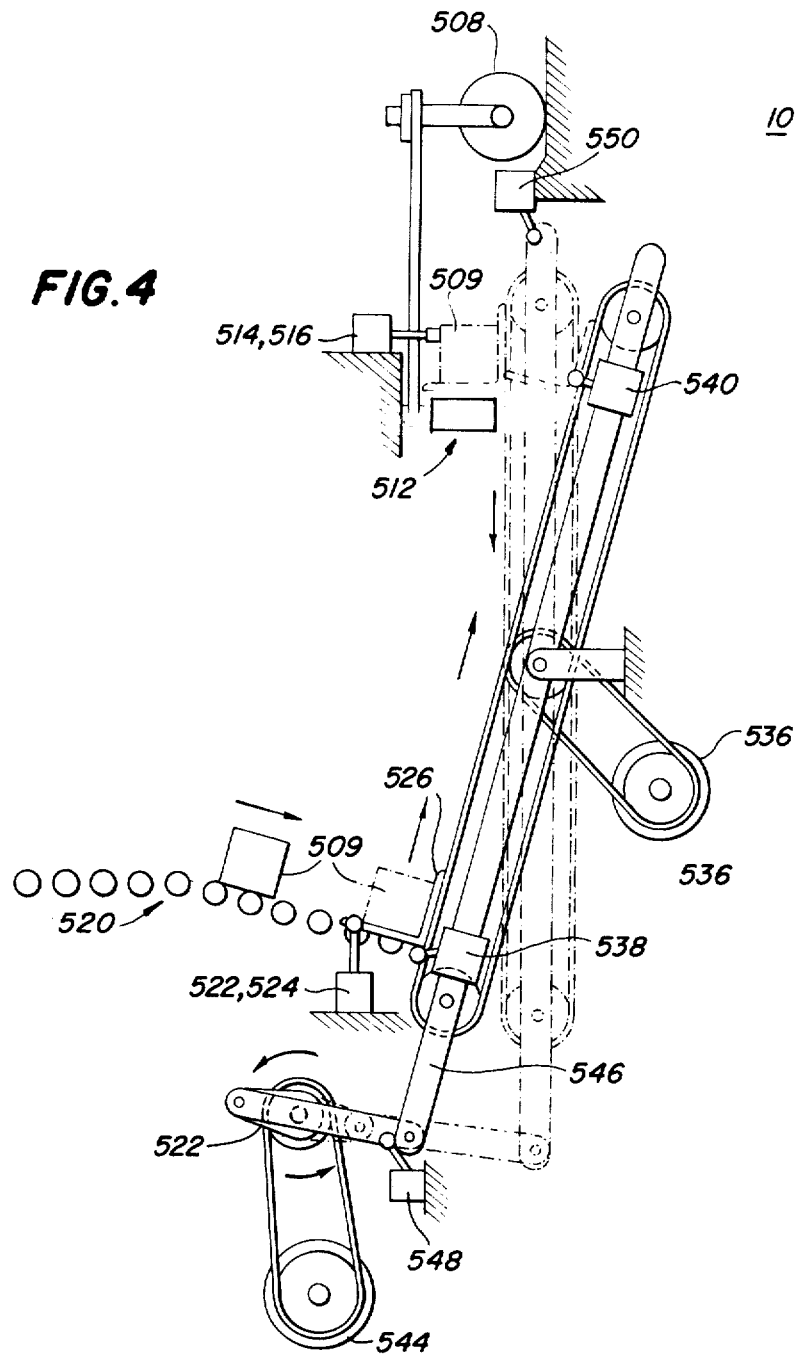
FIG. 4 is a schematic diagram of the loader components illustrating the drive motors and the position of limit switches for controlling the apparatus.
Figure 5:
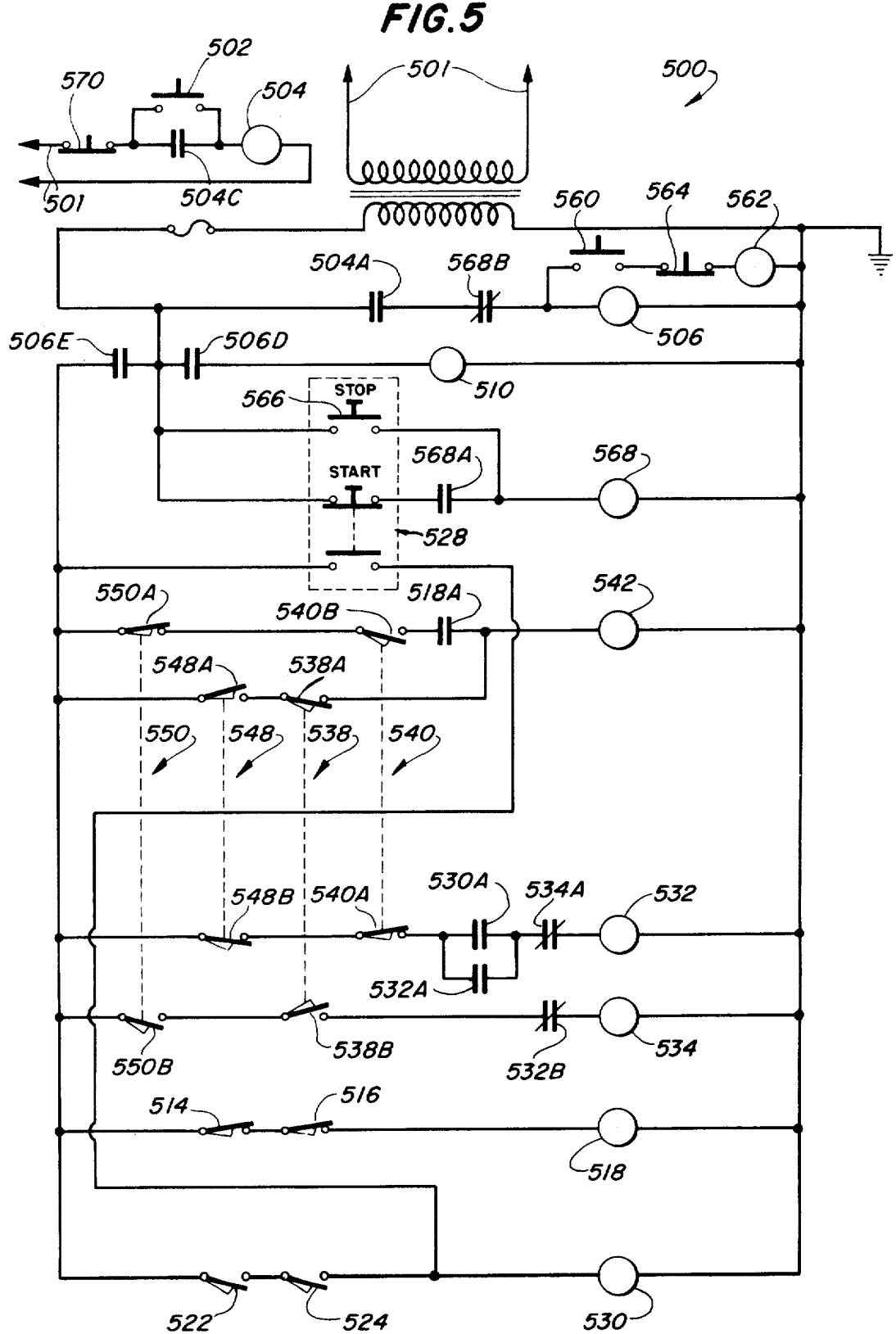
FIGS. 5 and 6 are schematic diagrams of an electrical control circuit for the apparatus.
Figure 6:
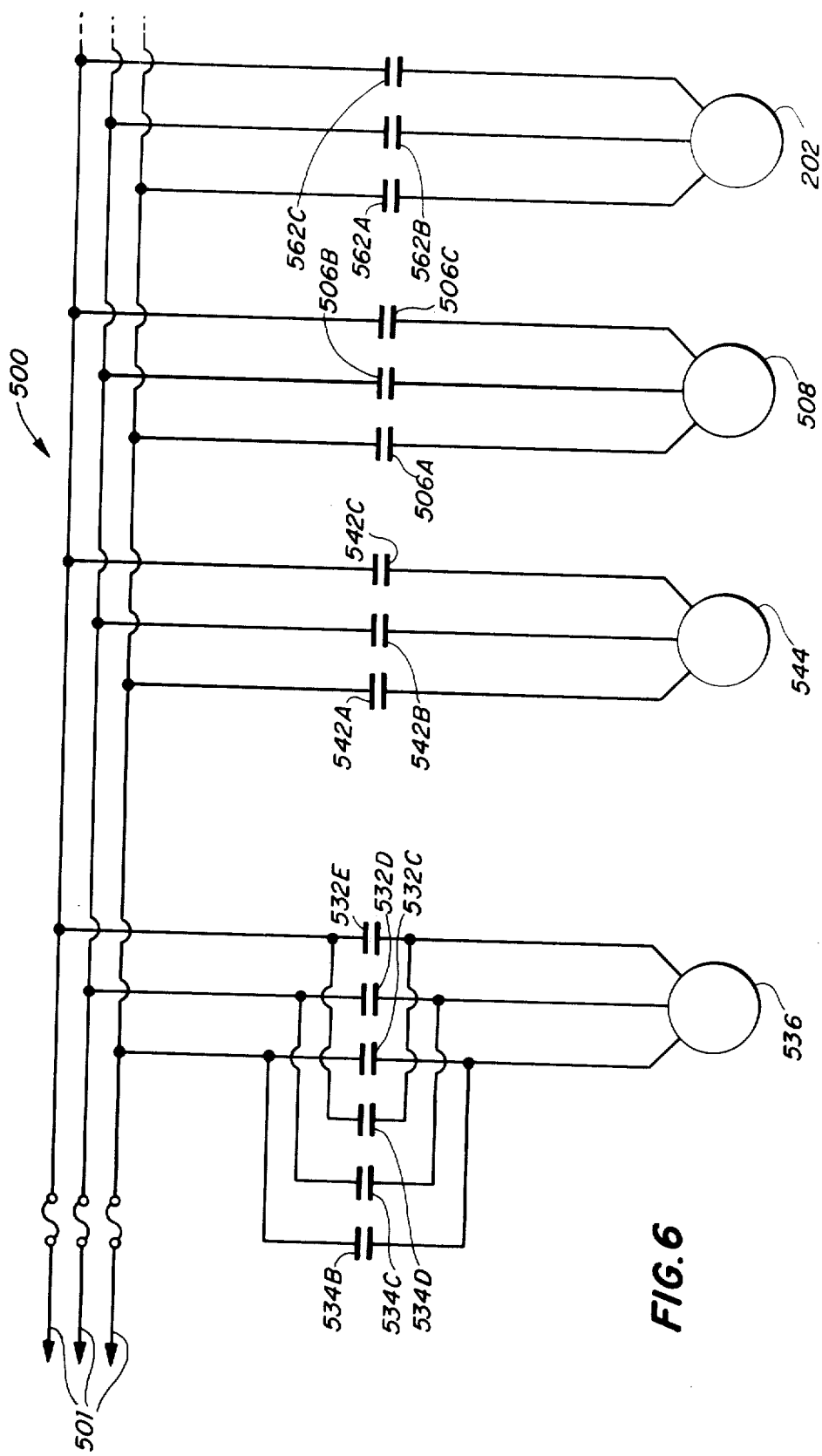

In order to obtain a complete understanding of the operational cycle of the feeding apparatus or loader 10, reference may be had to FIGS. 4, 5, and 6. FIG. 4 sets forth a diagrammatic view of the loader 10 including the various motors and limit switches for controlling the operation of the loader 10. FIGS. 5 and 6 set forth, in schematic form, a control circuit 500 for controlling the operation of the loader 10. A plurality of power input lines 501 for the motors of FIG. 5 and for the relays and starter relay coils of FIG. 4 are connected to a suitable source of alternating current power.

To initiate operation of the loader 10, a push-button start switch 502 is switched to its on position to energize a master control relay 504 to thereby energize a holding contactor 504C to maintain the relay 504 energized. Since, in most applications, the loader 10 is used in conjunction with other food processing equipment, such as a slicer, the switch 502 and the relay 504 are preferably located in a master control panel for the entire processing apparatus. Energizing the relay 504 closes a normally open set of relay contacts 504A to energize a starter relay coil 506 for the loader lateral discharge conveyor motor 508. Energizing the coil 506 closes a set of normally open relay coil contacts 506A, B, and C to start the conveyor motor 508 running.

A pair of normally open relay contacts 506D close when the relay 506 is energized to illuminate a "loader operating" indicator lamp 510. Also, a pair of normally open relay contacts 506E close when the relay 506 is energized to provide power to the remaining portions of the circuit 500.

Absence of an elongated mass of a food product or load 509 on the lateral discharge conveyor 512 allows a pair of limit switches 514 and 516 to remain closed thereby energizing a relay 518. Energizing the relay 518 causes a pair of normally open relay contacts 518A to close with no immediate effect.

An operator of the loader 10 at this time places a load 509 on the receiving table 520 which causes the loaf 509 to be gravity fed to a stop position at the lowermost end of the receiving table 520. In this position, the loaf 509 closes a pair of limit switches 522 and 524 to initiate the upward movement of a loader elevator 526. Alternatively, the upward movement of the loader elevator 526 may be initiated by depressing the double pole, double throw switch 528. Closure of the limit switches 522 and 524 or the depression of the switch 528 energizes a relay 530 to thereby close a pair of normally open relay contacts 530A.

Closure of the contacts 530A energizes a starter relay coil 532. Energizing the relay coil 532 closes a pair of normally open relay contacts 532A to hold the relay coil 532 energized and opens a pair of normally closed relay contacts 532B to prevent a starter relay coil 534 from being energized. Energizing the relay coil 532 further closes a set of normally open relay contacts 532C, D and E to cause the loader elevator motor 536 to start running in a forward direction. By operating in the forward direction, the loader elevator motor 536 causes the loader elevator 526 to move upward through the receiving table 520 to thereby release a limit switch 538, opening the contacts 538A and closing the contacts 538B.

The upward moving elevator 526 further engages and raises a loaf 509 to transport it upwards at a steady speed and also to open the limit switches 522 and 524 in the absence of the presence of an additional loaf 509 at the lowermost portion of the loader elevator 526. If the limit switches 522 and 524 are opened, the relay 530 is deenergized to open the relay contacts 530A with no immediate effect.

Upon reaching its uppermost position, the loader elevator 526 engages a limit switch 540 and opens a pair of switch contacts 540A and closes a pair of switch contacts 540B. Opening the switch contacts 540A deenergizes the relay coil 532 to terminate the running of the loader elevator motor 536 and to thereby stop the upward travel of the loader elevator 526. Closing the contacts 540B energizes a starter relay coil 542 to thereby close a set of normally open relay contacts 542A, B and C and to start the running of a loader positioning motor 544 to rotate a loader elevator support carriage 546 from a load position to a discharge position over the lateral discharge conveyor 512.

The movement of the support carriage 546 from the load position to the discharge position releases a limit switch 548 to close a pair of switch contacts 548A with no immediate effect and to open a pair of switch contacts 548B. Opening the switch contacts 548B prevents the energization of the relay coil 532 upon the subsequent closing of the switch contacts 540A.

When the support carriage 546 and the loader elevator 526 arrive at their discharge position, a limit switch 550 is engaged. Engaging the limit switch 550 opens a pair of switch contacts 550A to deenergize the relay coil 542 and thereby to stop the positioning motor 544. The stopping of the motor 544 completes the 180 degrees rotation of the positioning motor crank drive 552 and holds the support carriage 546 in a vertical position. Closing the contacts 550B energizes the starter relay coil 534 to open a pair of normally closed relay coil contacts 534A and to thereby prevent the relay coil 532 from becoming energized. Energizing the coil 534 also closes a set of normally open relay contacts 534B, C and D to start the elevator motor 536 running in the reverse direction.

By running in the reverse direction, the elevator motor 536 moves the elevator 526 downwardly to thereby discharge the loaf 509 on the lateral discharge conveyor 512. In moving downwardly from its uppermost position, the elevator 526 disengages the limit switch 540 causing the contacts 540A to close and the contacts 540B to open, both with no immediate effect. When the loaf 509 is deposited on the lateral discharge conveyor 512, the loaf 509 engages and opens the limit switches 514 and 516 to deenergize the relay 518. Deenergizing the relay 518 opens the relay contacts 518A with no immediate effect.

As the elevator 526 is moved downwardly by the elevator motor 536, the lateral discharge conveyor 512 transfers the loaf 509 to a loader discharge chute 554 for further processing by associated processing apparatus. If the discharge conveyor 512 should transfer the loaf 509 to the loader discharge chute 554 and thereby release and close the limit switches 514 and 516 before the downward movement of the elevator 526 has been completed, the subsequent energization of the relay 518 and the closure of the relay contacts 518A would not be effective to energize the relay coil 542 since the switch contacts 540B and 550A are open. When the elevator 526 reaches its lowermost position and engages the limit switch 538, the switch contacts 538B open to deenergize the relay coil 534 and thereby to close the relay contacts 534A. Deenergizing the relay coil 534 stops the running of the elevator motor 536 thereby stopping the downward movement of the elevator 526.

In response to the engagement of the limit switch 538 by the elevator 526, the switch contacts 538A are closed thereby energizing the starter relay 542 to start the positioning motor 544 running and thereby to rotate the support carriage 546 and the elevator 526 from the vertical discharge position to the load position. The movement of the support carriage 546 away from the vertical position disengages the limit switch 550 thereby to close the contacts 550A and open the contacts 550B to prevent the energization of the relay coil 534 upon the closure of the contacts 538B.

When the support carriage 546 and the elevator 526 arrive at their load position, the carriage 546 engages the limit switch 548. Engaging the limit switch 548 opens the switch contacts 548A to deenergize the relay coil 542 and thereby to stop the running of the positioning motor 544. The positioning motor 544 stops after the positioning motor crank drive 552 has undergone 180° of rotation.

Engaging the limit switch 548 further closes the switch contacts 548B which will not effect the energization of the relay coil 532 unless the limit switches 522 and 524 are closed, indicating the presence of a loaf 509 at the lowermost or stop position of the loader receiving table 520. The loader elevator 526 can also be raised to its uppermost position in the absence of a loaf 509 at the lowermost or stop position of the receiving table 520 by a depression of the switch 528 as discussed above. Depression of the switch 526 will cause the above operational cycle of the loader 10 to repeat.

In a particular embodiment, the control circuit 500 may be further utilized to control one or more motors 202 for driving one or more rotary cropping knives 558 for removing the longitudinal end portions of the loaves 509. After the loader 10 has been energized by depressing the start switch 502, the motors 202 may be energized by depresssing a start switch 560 thereby to energize a starter relay coil 562 to close a plurality of normally open relay contacts 562A, B and C. The motors 202 may be stopped by depressing a stop switch 564.

In order to momentarily interrupt the operation of the loader 10, a stop button 566 is depressed. Depression of the stop switch 566 energizes a relay 568 which is thereafter held energized by a set of normally open relay contacts 568A. Energizing the relay 568 opens a pair of normally closed relay contacts 568B to deenergize the relay coils 506 and 562 thereby to cause the motors 508 and 556 to stop running. Deenergizing the relay coil 506 opens the contacts 506B to turn off the lamp 510. Deenergizing the relay coil 506 also opens the contacts 506E to prevent further operation of the motors 536 and 544.

The operation of the loader 10 may further be interrupted in an emergency or at the end of a desired operational cycle by depressing a stop switch 570 preferably positioned on the master control panel adjacent the start switch 502. Depressing the stop switch 570 should deenergize the master control relay 504 thereby to open the contactor 504C and the relay contacts 504A. Upon the opening of the relay contacts 504A, the relay coils 506 and 562 are deenergized to stop the running of the motors 508 and 556, respectively. Further, the relay contacts 506D and 506E are opened by the deenergization of the relay 506 to turn off the lamp 510 and to prevent further operation of the motors 536 and 544.

Obviously, many modifications and variations of the present invention are possible in light of the above disclosure. For example, plural loaves disposed end-to-end can be handled simultaneously in the manner in which one loaf is handled as described above. Therefore, it is to be understood that, within the scope of the appended claims, the invention may be practiced otherwise than as specifically described.

What is claimed and desired to be secured by Letters Patent of the United States is:

1. Apparatus for handling elongated masses of material, each mass having a longitudinal axis, said apparatus comprising queuing table means for holding a plurality of masses side by side with their longitudinal axes parallel, said table means having a discharge side parallel to the longitudinal axis of a mass supported in a discharge position adjacent said discharge side, means adjacent said discharge side for elevating said masses sequentially from said discharge position to an elevated position said elevating means comprising an elongated carriage mounted for pivotal movement about a horizontally disposed axis and pivotal between a first upright position and a second inclined position, means for pivoting said structure between said positions, elevator means mounted on said carriage for reciprocal movement along said carriage upwardly toward an upper discharge position and downwardly toward a lower receiving position, means for driving said elevator upwardly and downwardly along said carriage, said elevator means including means for lifting an elongated mass positioned on the discharge side of said table means as said elevator is driven upwardly from said lower receiving position with said carriage in said second inclined position and to discharge said lifted mass onto said conveying means as said elevator means is driven downwardly along said carriage with said carriage in said first upright position after said carriage has been pivoted to said first upright position with said elevator means in said upper discharge position, and conveyor means for receiving the masses from said elevating means adjacent said elevated position and conveying said masses in end-to-end relation in a direction parallel of the longitudinal axes of the masses.

2. The apparatus of claim 1 further comprising means for receiving the masses from said conveyor means and for directing the masses downwardly.

3. The apparatus of claim 2 wherein said receiving and directing means comprises a downwardly curved chute having an upper open end positioned to receive the masses from said conveyor means and a lower open end positioned to discharge the masses downwardly.

4. The apparatus of claim 1 wherein said queuing table means comprises a plurality of parallel freely rotatable rollers arranged to permit the masses to be moved in side by side abutting relation across said rollers from a mass-receiving side of said table to a mass-discharging side of said queuing table means.

5. The apparatus of claim 4 wherein a portion of said queuing table means at said mass-discharging side is inclined downwardly.

6. The apparatus of claim 1 further comprising means for controlling said pivoting means and said driving means to cause sequentially, said elevator means to be driven upwardly along said carriage to said upper discharge position with said carriage in said second inclined position, said carriage to be pivoted from said second inclined position to said first upright position with said elevator means in said upper discharge position, said elevator means to be driven downwardly along said carriage to said lower rest position with said carriage in said first upright position, and said carriage to be pivoted to said second inclined position with said elevator means in said lower receiving position.

7. The apparatus of claim 1 further comprising means including sensing means for preventing pivotal movement of said carriage away from said second inclined position toward said first vertical position with said elevator means in said upper discharge position when another such elongated mass is on said conveyor means as detected by said sensing means.

8. The apparatus of claim 1 wherein said conveyor means comprises a plurality of parallel rollers having their axes disposed in a common plane, said rollers being positioned to receive the masses sequentially from said elevating means such that said masses are disposed longitudinally across said rollers transverse to the axes of said rollers, and means for driving said rollers to convey the masses along the longitudinal axes of said masses.

9. The apparatus of claim 8 wherein said driving means includes slip clutch means for enabling said roller to stall if a mass on said rollers is blocked from being conveyed by said conveyor means.

10. The apparatus of claim 8 including elongated guide means transverse to the axes of said rollers for guiding said masses in end-to-end longitudinal movement driven by said roller.

11. The apparatus of claim 2 wherein said conveyor means includes adjustable support means for angularly adjusting said common plane relative to the horizontal about an axis transversely of said axes of said rollers.

12. The apparatus of claim 9 wherein said slip clutch means includes a belt drivingly engaging said rollers and pinch rollers for biasing said belt against said rollers to turn the same.

* * * * *